(12) United States Patent
Sarkar et al.

(10) Patent No.: US 8,571,600 B2
(45) Date of Patent: *Oct. 29, 2013

(54) REDUCING POWER CONSUMPTION OF WIRELESS DEVICES

(75) Inventors: Shantanu Sarkar, San Jose, CA (US); Roger Chi-yee Cheung, San Jose, CA (US); Morris J. Katz, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 472 days.

This patent is subject to a terminal disclaimer.

(21) Appl. No.: 12/713,562

(22) Filed: Feb. 26, 2010

(65) Prior Publication Data

US 2011/0212746 A1    Sep. 1, 2011

(51) Int. Cl.
*H04M 1/00*    (2006.01)

(52) U.S. Cl.
USPC .............. 455/552.1; 455/434; 455/435.2; 455/3.04; 455/464; 455/150.1; 455/188.1

(58) Field of Classification Search
USPC .......... 455/552.1, 434, 435.2, 3.04, 464, 455/150.1, 188, 1, 188.1
See application file for complete search history.

(56) References Cited

U.S. PATENT DOCUMENTS

| | | | |
|---|---|---|---|
| 5,812,955 A | 9/1998 | Dent et al. | |
| 5,915,224 A | 6/1999 | Jonsson | |
| 6,144,288 A * | 11/2000 | Jahn et al. | 340/10.33 |
| 6,389,299 B1 | 5/2002 | Park | |
| 6,560,443 B1 | 5/2003 | Vaisanen et al. | |
| 6,681,118 B2 | 1/2004 | Raffel et al. | |
| 6,922,559 B2 | 7/2005 | Mohammed | |
| 7,353,012 B2 * | 4/2008 | Miyano et al. | 455/277.1 |
| 2001/0010689 A1 | 8/2001 | Awater et al. | |
| 2001/0036835 A1 | 11/2001 | Leedom | |
| 2002/0075844 A1 | 6/2002 | Hagen | |
| 2002/0085516 A1 | 7/2002 | Bridgelall | |
| 2003/0018887 A1 | 1/2003 | Fishman et al. | |
| 2003/0100308 A1 | 5/2003 | Rusch | |
| 2003/0119548 A1 | 6/2003 | Mohammed | |
| 2004/0204084 A1 | 10/2004 | Tan et al. | |
| 2004/0259544 A1 | 12/2004 | Amos | |
| 2007/0191069 A1 | 8/2007 | Matsumoto | |
| 2008/0002605 A1 | 1/2008 | Todd et al. | |
| 2008/0119243 A1 | 5/2008 | Matsumoto et al. | |

FOREIGN PATENT DOCUMENTS

| | | |
|---|---|---|
| EP | 1 119 137 | 7/2001 |
| EP | 1 809 056 A2 | 7/2007 |
| WO | WO 01/97454 | 12/2001 |
| WO | WO 02/093811 | 11/2002 |

OTHER PUBLICATIONS

Invitation to Pay Additional Fees and Communication Relating to the Results of the Partial International Search dated May 11, 2011.
PCT/US11/24425 International Search Report and the Written Opinion of the International Searching Authority dated Jul. 8, 2011.
International Preliminary Report on Patentability dated Aug. 28, 2012 for the related PCT/US2011/024425.

* cited by examiner

*Primary Examiner* — Nghi H Ly
(74) *Attorney, Agent, or Firm* — Tucker Ellis LLP (57) ABSTRACT

Described in example embodiments herein are techniques that combine at least two network (communication) technologies (such as protocols, signaling methods, etc.) and limit when a wireless device employs one of the technologies. In an example embodiment, a passive technology, such as a Radio Frequency Identification (RFID) technology, can be employed to determine whether a certain network technology is available.

17 Claims, 4 Drawing Sheets

REDUCING POWER CONSUMPTION OF WIRELESS DEVICES

TECHNICAL FIELD

The present disclosure relates generally to energy savings.

BACKGROUND

Wireless devices connect to a wireless network (for example a cellular network and/or a wireless local area network or "WLAN") to facilitate collaboration anytime, anywhere. Wireless network designs often involve tradeoffs among response time, data rate, and coverage. In order to get a good response time, the radio has to be turned on frequently, or continuously. Higher data rates typically consume more power than lower data rates. Communications over longer distances typically consume more power than communications over shorter distances. In order to reduce power consumption, the traditional approach is to sacrifice response time, data rate, and coverage. For example, wireless devices employing Zigbee®, which consume much less power than WiFi wireless devices, can have beacon rates ranging from 48 milliseconds (ms) to 786 seconds (sec.) at 20 kbps (Kilobits per Second) with a coverage area typically ranging from 10 to 75 meters, whereas WiFi response times are in the millisecond range, can have data rates of Megabits per second, and coverage areas extending to hundreds of meters.

BRIEF DESCRIPTION OF THE DRAWINGS

The accompanying drawings incorporated herein and forming a part of the specification illustrate the examples embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended neither to identify key or critical elements of the example embodiments nor to delineate the scope of the appended claims. Its sole purpose is to present some concepts of the example embodiments in a simplified form as a prelude to the more detailed description that is presented later.

In accordance with an example embodiment, there is disclosed herein an apparatus comprising a first wireless transceiver employing a first communication technology, a second wireless transceiver employing a second communication technology, and control logic coupled to the first transceiver and second transceiver. The control logic is operable to determine whether the first wireless transceiver operates in an operating state or in a power save state. While the first transceiver is in the operating state, the control logic is responsive to a predetermined signal received via the first transceiver to establish communication with a wireless network employing the second communication technology via the second wireless transceiver, and to switch the first wireless transceiver into the power save state while the second wireless transceiver is communicating with the wireless network.

In accordance with an example embodiment, there is disclosed herein an apparatus comprising a first wireless transceiver employing a first communication technology, a second wireless transceiver employing a second communication technology, a wireless signal detector circuit operable to receive a wireless signal indicating that communications employing the second communication technology are available, and control logic coupled to the first transceiver, second transceiver, and wireless signal detector. The control logic is operable to determine whether the first wireless transceiver operates in an operating state or in a power save state. The control logic is responsive to the wireless signal detector receiving a predetermined signal indicating that communications employing the communication technology is available to establish communications with a wireless network via the second wireless transceiver and to discontinue communications using the first wireless transceiver.

In accordance with an example embodiment, there is disclosed herein an apparatus comprising a wireless transceiver configured to communicate employing a first network technology, an interface operable to receive a first signal indicating when a wireless device is within a predetermined area, and control logic coupled to the wireless transceiver and the interface. The control logic is configured to send a second signal to the wireless device to begin communicating using the second wireless technology via the wireless transceiver responsive to the first signal.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in example embodiments herein are techniques that combine at least two wireless network (communications) technologies (such as protocols, signaling methods, etc.) and limit when a wireless device employs one of the technologies. In an example embodiment, a passive technology, such as a Radio Frequency Identification (RFID) technology, can be employed to determine whether a certain network technology is available.

For example, some wireless devices have dual mode capabilities, such as for example cellular telephone and WiFi (and/or BLUETOOTH). If the WiFi transceiver is turned on, however, the device will continuously search for WiFi access points to associate, even when the wireless device is in an area where WiFi is not available, which can substantially reduce battery life. In an example embodiment, the wireless device is equipped with a means for broadcasting a second signal. The second signal may be transmitted by an RFID tag with an identifier for the device (for example a phone number). Alternatively, the wireless device may employ an additional transmitter for transmitting a predefined signal to enable a wireless network to determine when the wireless device is within proximity of the network. In an example embodiment, a receiving circuit (or a RFID detector) can be placed in the WiFi access point (AP) or at a remote choke point and communicatively coupled to the AP. If the receiving circuit (or RFID detector) detects the predefined signal, a signal (or a message such as a short message service "SMS" message) can be sent to the wireless device. The wireless device may be configured automatically to turn on, or a message can be displayed to prompt a user to turn on the WiFi transceiver. In particular embodiments, receiving circuits such as RFID detectors at a plurality of locations can be employed to determine which AP is the best candidate for associating the wireless device. In an example embodiment, the network can perform association in the background. When the user desires to use WiFi, the network can send a message to the wireless device via the cellular network to direct the wireless device to associate with a particular AP, and the wireless device can skip scanning SSIDs and/or APs. As another example, if the network needs to communicate with the wireless device via WiFi, the network can send a message to the wireless device via the cellular network to direct the wireless device to associate with a particular AP, and the wireless device can skip scanning SSIDs and/or APs. In an example embodiment, RFID detectors are placed at predetermined locations, for example at choke points such as entrances to a building or other areas where WiFi service is available that are coupled to the wireless network. When an RFID detector detects the wireless device, a signal can be sent to the wireless device informing the wireless device, and/or a user of the wireless device, that WiFi service is available.

In an example embodiment, the wireless device can be equipped with a receiving circuit operable to detect signals from a low-power third wireless network (for example from a Zigbee network). When the receiving circuit detects the third wireless network (e.g., a Zigbee signal), the second (e.g., WiFi) high-power transceiver can be activated.

Those skilled in the art should recognize that although example embodiments described herein use cellular and WiFi networks, the principles described herein are suitable to be implemented with any combination of wireless technologies. For example, the wireless device may be configured to communicate with a satellite network and a cellular network. Other combinations may include WiFi and BLUETOOTH, WiFi and Zigbee®, cellular network and BLUETOOTH, cellular network and Zigbee®, etc.

Figure 1:
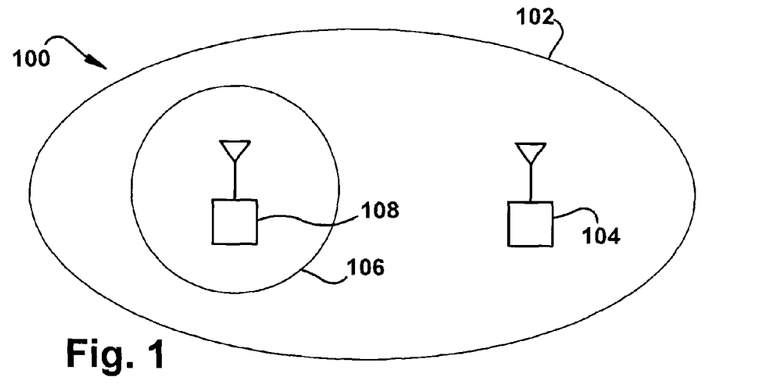
FIG. 1 illustrates an example of a network configured in accordance with an example embodiment.

FIG. 1 illustrates an example of a network 100 configured in accordance with an example embodiment. Network 100 comprises a first wireless network that supports a first network technology provided by wireless device 104, and area 102 illustrates an example of a coverage area for the first wireless network. A second wireless network that supports a second network technology is provided by wireless device 108. The coverage area for the second wireless technology is denoted by area 106. Those skilled in the art should readily appreciate the coverage areas 102, 106, number of network technologies (which includes but is not limited to wireless network protocols, signaling techniques, etc.) illustrated and the number of wireless devices providing service in the coverage areas were merely selected for ease of illustration as those skilled in the art should readily appreciate that the principles described herein can be applied to any physically realizable number of coverage areas, network technologies, and/or wireless devices providing service for a particular network technology and/or service area.

In an example embodiment, when a mobile wireless device (not shown, see for example FIG. 4 or 5) is operating within area 102, it can receive service from wireless device 104. If the mobile wireless device is within area 106, it can receive service from either wireless device 104 or wireless device 108. In an example embodiment, the mobile wireless device prefers to receive service from wireless device 108. This may be because less power is needed to communicate with wireless device 108 and/or wireless device 108 offers service at a lower cost than wireless device 104 or provides other benefits such as improved performance.

In an example embodiment (see for example FIG. 4), the wireless mobile device comprises a reflecting device such as a radio frequency identification (RFID) tag. When the wireless mobile device enters within area 106, energy from the signal from wireless device 108 is reflected and enables a device with a wireless sensing circuit (for example either wireless device 108 or wireless device 104) to detect the reflected signal from the mobile wireless device. In particular embodiments, the reflecting circuit transmits an identifier for the wireless mobile device, such as a phone number. Wireless device 104 signals the mobile wireless device, informing the mobile wireless device that communication with wireless device 108 is possible responsive to a reflected signal being detected from the mobile wireless device. The signal may be any predetermined signal. For example, the signal may comprise a predetermined data format. In other example embodiments, the signal may be a short message service (SMS) message, which the mobile wireless device may display to a user and wait for a user input before switching to wireless device 108 or may automatically switch to the appropriate network technology for communicating with wireless device 108. In particular embodiments, the transceiver for communicating with wireless device 104 may be switched into a power save state while the mobile wireless device is communicating with wireless device 108.

Figure 2:
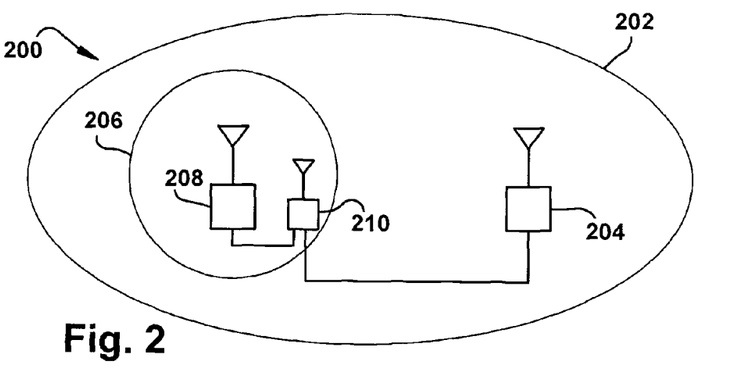
FIG. 2 illustrates an example of a network configured to determine whether a wireless device is in proximity of a sensor, and configured to signal the wireless device to change the communications mechanism

In an example embodiment, a sensor for detecting the reflected signal from the mobile wireless device may be coupled to one of the wireless devices providing service to the mobile wireless device. For example, referring to FIG. 2, area 202 is serviced by wireless device 204 and area 206 can be serviced by either wireless device 204 and/or wireless device 208. Sensor 210 is placed at a location within area 206, for example at a choke point, perimeter, or any other suitable location for detecting when the mobile device is entering and/or exiting area 206. Sensor 210 is coupled to wireless device 204. When the mobile wireless device enters area 206 while communicating with mobile wireless device 204, sensor 210 can detect that the wireless device is within area 206, and can communicate with wireless transceiver 204. Wireless transceiver 204 may then send a message to the mobile wireless device to switch to the appropriate network technology to communicate with wireless device 208. In an example embodiment, when the wireless mobile device exits area 206, sensor 210 may detect this and signal wireless device 204 and/or wireless device 208, enabling the appropriate wireless device to signal the mobile wireless device to establish communication with wireless device 204.

Figure 3:
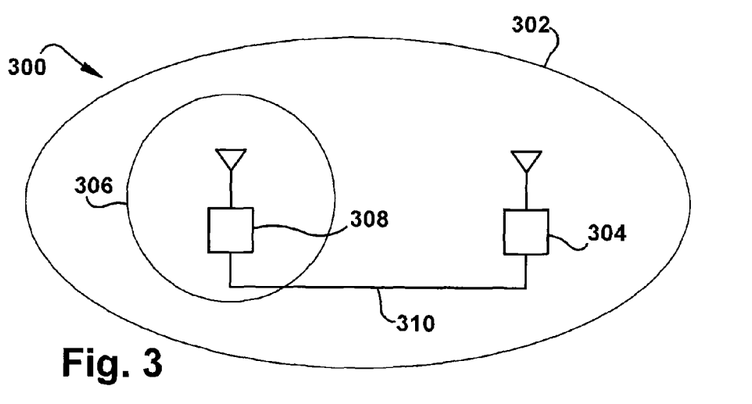
FIG. 3 illustrates an example of a network where a wireless transceiver employing a first wireless technology with a wireless transceiver employing a second wireless technology.

In an example embodiment, the wireless transceivers providing the various network technologies may communicate with each other. For example, as illustrated in FIG. 3, wireless device 304 which provides wireless service to area 302 employing a first network technology is coupled to wireless device 308 which is providing wireless service to area 306 as illustrated by connection 310. Connection 310 may be a wireless connection, wired connection, or a combination of wired and wireless links. In this embodiment, as the mobile wireless device roams into area 306, wireless device 304 may signal the mobile wireless device to communicate with wireless device 308 and may also signal wireless device 308 to aid in establishing communication between the mobile wireless device and wireless device 306. Likewise, when a mobile wireless device exits area 306, wireless device 308 can signal wireless device 304 via connection 310 to facilitate establishing communication between the mobile wireless device and wireless device 304.

In an example embodiment (see for example FIG. 5), the mobile wireless device suitably comprises a first wireless device, a second wireless device, control logic, and a sensor for determining when it is in a predefined coverage area, such as area 106 in FIG. 1, 206 in FIG. 2, and/or 306 in FIG. 3. In operation, when the mobile wireless device is outside of the preferred area, the mobile wireless device communicates using the first wireless transceiver. When the sensor detects that the mobile wireless device has moved within range of a wireless device with a wireless technology compatible with the second wireless transceiver, the control logic switches the second wireless transceiver from a power save state to an operating state and establishes communications with the wireless device via the second wireless transceiver. In an example embodiment, the control logic transitions the first wireless transceiver into a power save state while the second wireless transceiver is in the operating state.

In an example embodiment, the sensor is a passive sensor that receives power from a predetermined signal indicating that the wireless mobile device is within the predefined coverage area. In particular embodiments, the sensor is a RFID tag sensor. In an example embodiment, a predetermined signal received by the sensor comprises data representative of an address of the source of the predetermined signal. In particular embodiments, the address is a Media Access Control (MAC) address of the source, for example the MAC address of an AP sending the signal.

In other example embodiments, other techniques may be employed for determining when the mobile wireless device is within the preferred coverage area such as area 106 (FIG. 1), 206 (FIG. 2), and/or 306 (FIG. 3). For example, area 102 (FIG. 1) may have a plurality of wireless devices 104. These wireless devices may use techniques such as received signal strength indication (RSSI) and/or Angle of Arrival (AOA) to determine the location of the mobile wireless device and whether the mobile wireless device is within area 106. In yet other example embodiments, the mobile wireless device may determine its location and send the coordinates to wireless device 104. For example, wireless device may use RSSI and/or AOA to determine its location and/or send RSSI and/or AOA data to wireless device 104 enabling wireless device 104, or any suitable device such as a location server coupled to wireless device 104, to determine the location of the mobile wireless device. As another example, the mobile wireless device may be equipped with a Global Positioning System (GPS) and may determine whether it is within area 106 and/or send GPS data to wireless device 104 enabling wireless device 104, or any suitable device such as a location server coupled to wireless device 104, to determine the location of the mobile wireless device.

Although the example embodiments describe roaming to a preferred wireless technology (e.g., the protocol provided by wireless device 108) for power savings, the example embodiments should not be construed as so limited. For example roaming to a wireless device providing a preferred wireless technology may be desirable for other reasons such as cost. For example, wireless service provided by wireless device 104 may be a pay for use service, whereas the wireless service provided by wireless device 108 may be a lower cost service, or even free. Thus, the example embodiments described herein should be construed as covering such scenarios.

Figure 4:
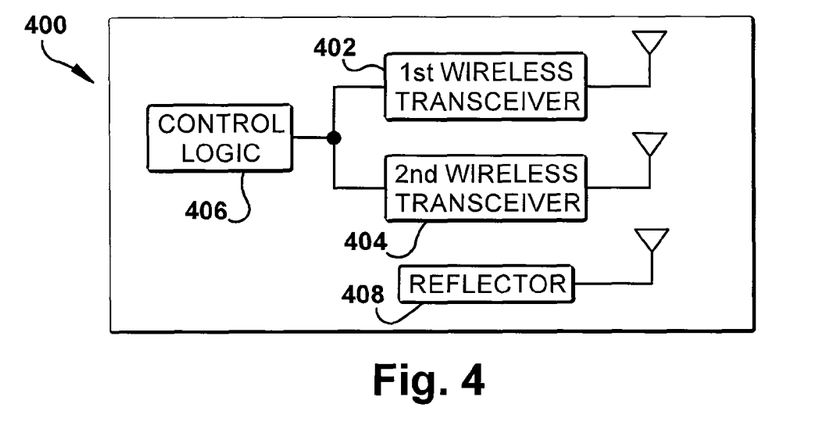
FIG. 4 is a block diagram illustrating an example of wireless device employing a signal reflecting device.

FIG. 4 is a block diagram illustrating an example of wireless device 400 employing a wireless signal reflecting circuit 408. Wireless device 400 comprises a first wireless transceiver 402 and a second wireless transceiver 404. First wireless transceiver 402 and second wireless transceiver 404 are coupled to control logic 406. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, the first wireless transceiver is configured to communicate employing a first network technology (e.g., signaling protocol). The second wireless transceiver is configured to communicate employing a second network technology. For example, the first wireless transceiver may be configured for cellular telephone communications while the second wireless transceiver is configured for WiFi. As another example, the first wireless transceiver may be configured for satellite communications while the second wireless transceiver is configured for cellular telephone communications. As yet another example, the first wireless transceiver may be configured for WiFi and the second wireless transceiver is configured to BLUETOOTH and/or Zigbee®. As one skilled in the art can readily appreciate, any physically realizable number of wireless transceivers configured with any physically realizable number of wireless technologies may be employed; however, for ease of illustration the example embodiments described herein show two transceivers. In particular embodiments, a single transceiver capable of operating in a plurality of network technologies may be employed, but for ease of illustration two transceivers will be used in the description herein.

Control logic 406 is operable to determine whether first wireless transceiver operates 402 in an operating state or in a power save state. As used herein, an operating state is that state where a transceiver has power and can communicate with external devices, whereas a power save state can include but is not limited to a state where power is reduced, or removed, from the transceiver and/or any clocks supplied to circuits within the transceiver are at a lower clock speed than in operating mode. In an example embodiment, in order to conserve power, when service from the second signaling technology is unavailable, control logic 406 puts second wireless transceiver 404 in a power save state. In particular embodiments, control logic 406 is configured to switch first transceiver 402 to a power save state while communications employing the second network technology are maintained.

In an example embodiment, wireless signal reflecting circuit 408 is operable to receive a wireless signal and generate a reflected signal in response to a received wireless signal. In an example embodiment, wireless signal reflecting circuit 408 is a passive circuit. By passive circuit is meant that wireless signal reflecting circuit 408 receives power form the wireless signal, and thus power does not need to be provided to wireless signal reflecting circuit 408 by apparatus 400. In particular embodiments, wireless signal reflecting circuit 408 is a radio frequency identification tag.

In an example embodiment, control logic 406 automatically switches the second wireless transceiver to the operating mode responsive to receiving the predetermined signal. In another example embodiment, control logic 406 is configured to output a message on a user interface indicating that communications employing the second signaling technology are available, waits for an input to establish communications employing the second signaling technology.

In an example embodiment, power consumption of first wireless transceiver 402 is greater than the power consumption of second wireless transceiver 404 while in the operating state. In another example embodiment, the cost of using a network associated with the first signaling technology is greater than the cost of using a network employing the second signaling technology.

In an example embodiment, the predetermined signal is a short message system (SMS) compatible message. The message may be displayed on a user interface informing a user that the service is available, or control logic 406 may be configured automatically to switch on the second wireless transceiver 404 responsive to receiving the SMS message via first wireless transceiver 402.

In an example embodiment, the reflected signal transmitted by wireless signal reflector 408 comprises data representative of an identifier for apparatus 400. For example the data representative of an identifier is a telephone number. As another example, the data representative of an identifier may be a MAC address associated with apparatus 400.

In an example embodiment, control logic 406 receives a second predetermined signal to initiate communications employing with the first signaling technology. This signal may be received via second wireless transceiver 404 and/or first wireless transceiver 402 (providing first wireless transceiver 402 is not in a power save state). Control logic 406 is responsive to the second predetermined signal to switch the first wireless transceiver 402 to an operating state and may optionally switch second wireless transceiver 404 to a power save state.

In an example embodiment, control logic 406 is configured to associate with a network device employing the second network technology before commencing communications with second wireless transceiver 404. For example, apparatus 400 may be pre-authenticated with the wireless device that will be communicating with second wireless transceiver 404. Data may be received via first wireless transceiver 402 that includes data for associating with the wireless device that will be communicating with second wireless transceiver 404. This data may include beacon rates, encryption keys, scheduled time slots, etc.

Figure 5:
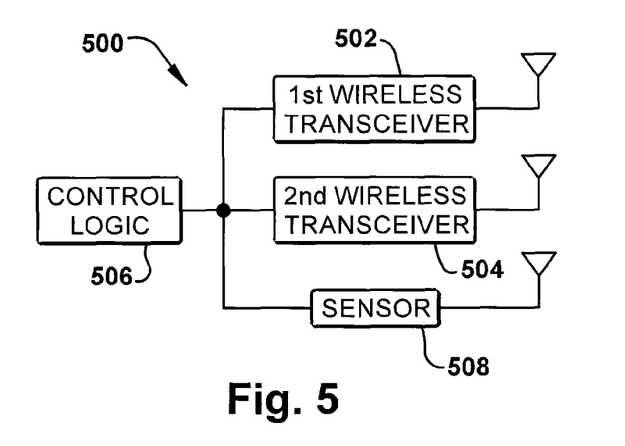
FIG. 5 is a block diagram illustrating a wireless device employing a sensor to aid in determining which signaling technology the device should employ.

FIG. 5 is a block diagram illustrating a wireless device 500 employing a sensor 508 for detecting a predetermined wireless signal to aid in determining which signaling technology the device should employ. Wireless device 500 comprises a first wireless transceiver 502 employing a first signaling technology, a second wireless transceiver 504 employing a second signaling technology. Control logic 506 is coupled to first transceiver 502, second transceiver 504, and wireless signal detector 508. Control logic 506 is operable to determine whether first wireless transceiver 502 is in an operating state or in a power save state. For example, in an example embodiment control logic 506 is responsive to sensor 506 detecting a predetermined signal indicating that communications employing the second network technology to establish communication with a wireless network employing the second network technology via second wireless transceiver 504. Once communications employing the second network technology is established, communications employing the first network technology may cease, and control logic 506 may put first wireless transceiver 502 into a power save mode.

In particular embodiments, control logic 506 is also operable to control whether the second wireless 504 is in an operating state or power save state. For example, while first transceiver 502 is in the operating state, control logic 506 may put second wireless transceiver 504 into a power save state. Control logic 506 is responsive to sensor 506 detecting a predetermined signal indicating that communications employing the second technology is available to switch second wireless 504 transceiver to the operating state and to establish communication with a wireless network employing the second signaling technology via second wireless transceiver 504.

In an example embodiment, sensor 508 is a passive sensor. In particular embodiments, sensor 508 is a radio frequency identification tag sensor.

In an example embodiment, the predetermined signal comprises data identifying a source of the predetermined signal. For example, the data identifying a source of the predetermined signal is a Media Access Control (MAC) address of the source.

In an example embodiment, control logic 506 automatically establishes communications employing the second network technology via second wireless transceiver 504 responsive to sensor 508 detecting the predetermined signal. In another example embodiment, control logic 506 is configured to output a message on a user interface indicating that communications employing the second signaling technology are available, waits for an input to establish communications employing the second network technology.

In an example embodiment, power consumption of first wireless transceiver 502 is greater than the power consumption of second wireless transceiver 504 while in the operating state. In another example embodiment, the cost of using a network associated with the first signaling technology is greater than the cost of using a network employing the second signaling technology.

In an example embodiment, control logic 506 is configured to associate with a network device employing the second signaling technology before commencing communications with second wireless transceiver 504. For example, control logic 506 may be pre-authenticate employing first wireless transceiver 502 before starting communications employing the second network technology. Control logic 506 may receive data via first wireless 502 for communicating using the second signaling technology, this data may include beacon rates, encryption keys, scheduled time slots, etc.

Figure 6:
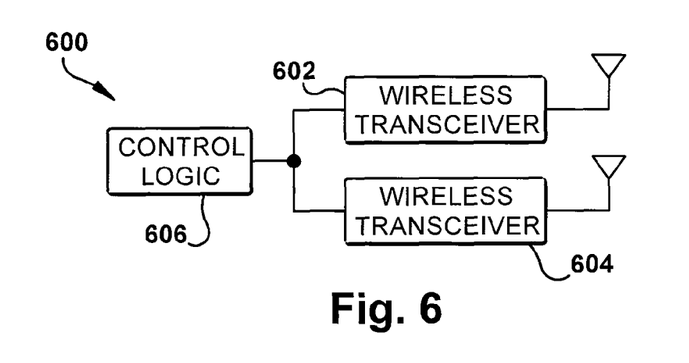
FIG. 6 illustrates an example of a network infrastructure node configured in accordance with an example embodiment.

FIG. 6 illustrates an example of a network infrastructure 600 node configured in accordance with an example embodiment. Network infrastructure node 600 is suitable for implementing wireless device 104 (FIG. 1), wireless device 108

(FIG. 1), wireless device 204 (FIG. 2), wireless device 208 (FIG. 2), wireless device 304 (FIG. 3), and/or wireless device 308 (FIG. 3).

Network infrastructure node 600 comprises a wireless transceiver 602, a communications interface 604 and control logic 606 coupled to wireless transceiver 602 and communications interface 604. In an example embodiment, control logic 606 is responsive to receiving a first signal via interface 604 indicating that a wireless device is within a predetermined area to send a second signal to the wireless device to begin communicating using the second wireless technology via wireless transceiver 602.

In an example embodiment, the first message comprises data identifying the wireless device. For example, the first message may contain a telephone number for the wireless device. As another example, the first message may contain a MAC address for the wireless device.

In an example embodiment, the second message is sent in a predetermined message format. For example, the second signal may be a SMS message.

Figure 7:
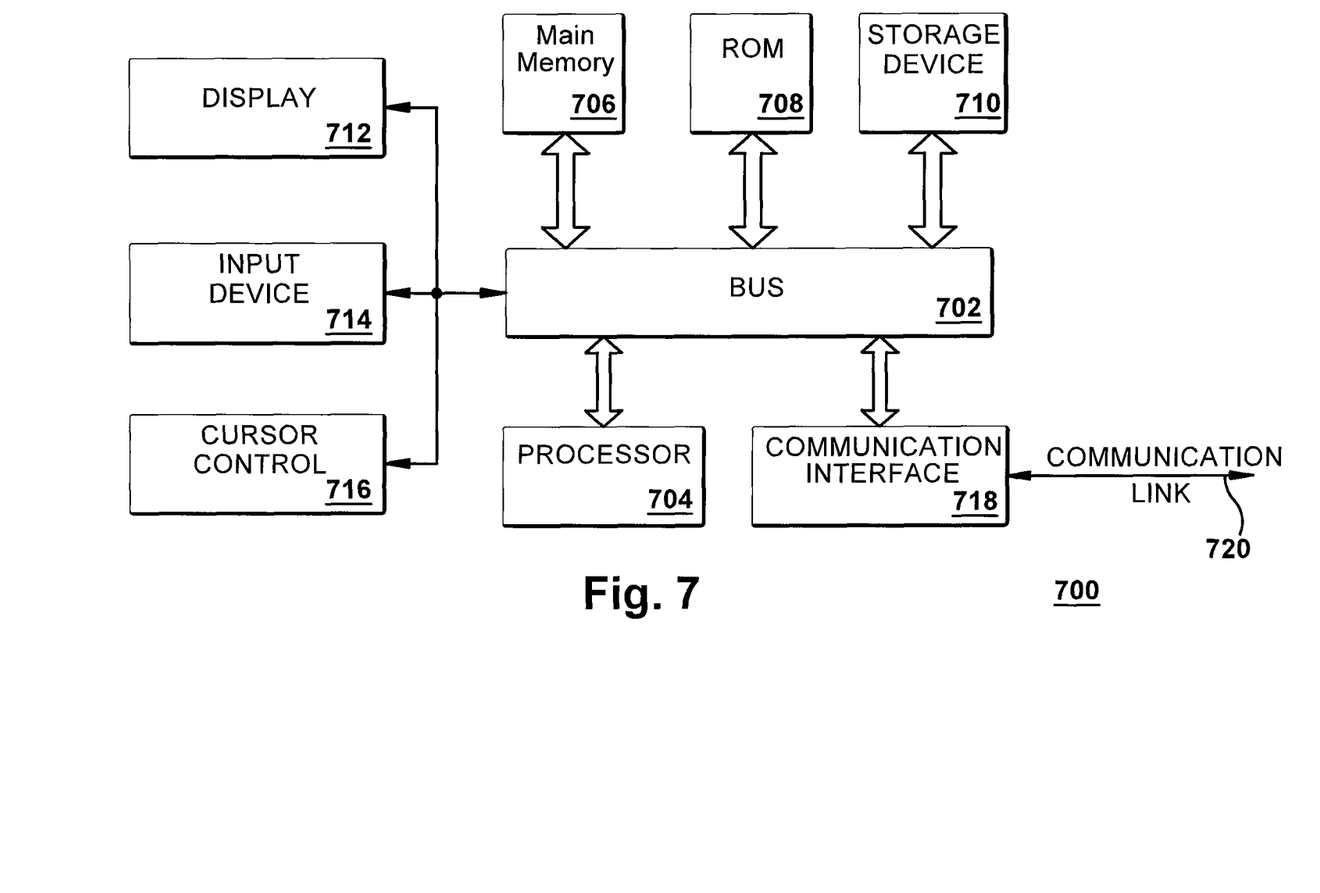
FIG. 7 illustrates an example of a computer system upon which an example embodiment may be implemented.

FIG. 7 illustrates an example of a computer system 700 upon which an example embodiment may be implemented. For example, computer system 700 may be employed by wireless device 104 (FIG. 1), wireless device 108 (FIG. 1), wireless device 204 (FIG. 2), wireless device 208 (FIG. 2), wireless device 304 (FIG. 3), wireless device 308 (FIG. 3), control logic 406 (FIG. 4), control logic 506 (FIG. 5), and/or control logic 606 to implement the functionality described herein.

Computer system 700 includes a bus 702 or other communication mechanism for communicating information and a processor 704 coupled with bus 702 for processing information. Computer system 700 also includes a main memory 706, such as random access memory (RAM) or other dynamic storage device coupled to bus 702 for storing information and instructions to be executed by processor 704. Main memory 706 also may be used for storing a temporary variable or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may further include a user interface comprising Display 712, Input Device 714 and/or Cursor Control 716. For example, computer system 700 may be coupled via bus 702 to a display 712 such as a cathode ray tube (CRT) or liquid crystal display (LCD), for displaying information to a computer user. An input device 714, such as a keyboard including alphanumeric and other keys is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g. x) and a second axis (e.g. y) that allows the device to specify positions in a plane.

An aspect of the example embodiment is related to the use of computer system 700 for reducing power consumption of wireless devices. According to an example embodiment, reducing power consumption of wireless devices is provided by computer system 700 in response to processor 704 executing one or more sequences of one or more instructions contained in main memory 706. Such instructions may be read into main memory 706 from another computer-readable medium, such as storage device 710. Execution of the sequence of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 704 for execution. Such a medium may take many forms, including but not limited to non-volatile media, and volatile media. Non-volatile media include for example optical or magnetic disks, such as storage device 710. Volatile media include dynamic memory such as main memory 706. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 700 also includes a communication interface 718 coupled to bus 702. Communication interface 718 provides a two-way data communication coupling computer system 700 to communication link 720. This enables communication system 700 to communicate with other devices. Communication interface 718 may suitably comprise a wireless and/or wired communication transceiver. For example, communication interface 718 may include a wireless transceiver for implementing the functionality of wireless transceivers 402 (FIG. 4), 404 (FIG. 4), 502 (FIG. 5), 504 (FIG. 5), and/or 602 (FIG. 6). In an example embodiment, communication interface 718 can implement the functionality of communication interface 604 (FIG. 6).

Figure 8:
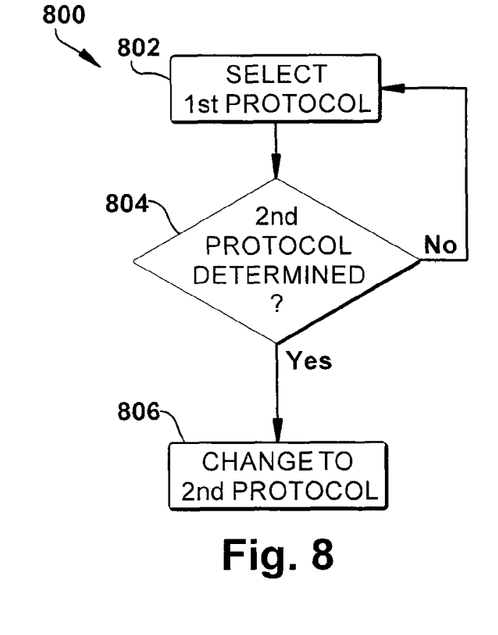
FIG. 8 illustrates an example of a methodology employed by a wireless device for selecting a signaling technology based on whether a signaling technology is detected.
Figure 9:
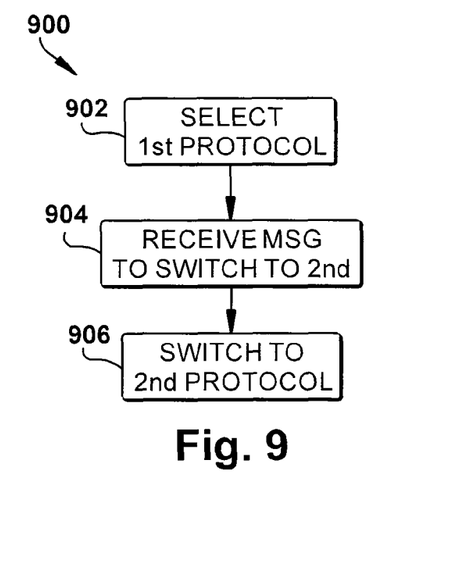
FIG. 9 illustrates an example of a methodology employed by a wireless device for selecting a signaling technology based on a received message.
Figure 10:
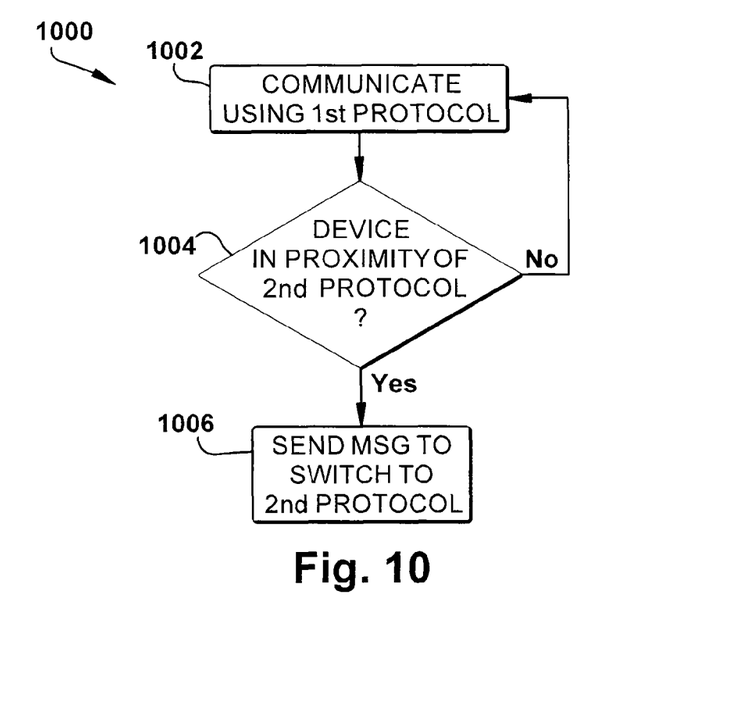
FIG. 10 illustrates an example of a methodology employed by an infrastructure node for instructing a wireless device to switch to a second signaling technology.

In view of the foregoing structural and functional features described above, methodologies in accordance with example embodiments will be better appreciated with reference to FIGS. 8-10. While, for purposes of simplicity of explanation, the methodologies of FIGS. 8-10 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the methodologies in accordance with an aspect of the example embodiments. The methodologies described herein are suitably adapted to be implemented in hardware, software, or a combination thereof.

FIG. 8 illustrates an example of a methodology 800 employed by a wireless device for selecting a wireless network technology based on whether a preferred wireless network technology is detected. Methodology may be implemented by any one or more of control logic 406 (FIG. 4), control logic 506 (FIG. 5), and/or processor 704 (FIG. 7).

At 802, communications are established by a first wireless transceiver using a first wireless technology. While using the first technology, a second wireless transceiver configured to communicate using a second network technology may be put in a power save state.

At 804, a determination is made whether a wireless signal indicating service is available for a second wireless technology was detected. The wireless signal may be detected by a wireless signal detector, such as a passive detector a RFID tag detector, and/or by a transceiver employing the second network technology. If at 804, a wireless signal corresponding to the second wireless technology was not detected (NO), then communications continue with the first wireless transceiver.

If, at 804, a wireless signal indicating that service for the second network technology is available was detected (YES), at 806 communications are established with a wireless network using the second network technology. In an example embodiment, the first wireless transceiver is switched to a power save state while communicating using the second wireless transceiver. In an example embodiment, the second wireless transceiver may be switched to a power save state while communications employing the second network technology are unavailable.

In an example embodiment, communications using the second technology are initiated automatically responsive to detecting the wireless signal indicating that service for the second wireless technology is available. In another example embodiment, a message is output to a user (e.g. audio, visual and/or audiovisual) indicating that service from the second wireless technology is available and waits for an input confirming the switch to use the second wireless technology before switching to the second wireless technology.

In an example embodiment, the wireless signal indicating that the second technology is available comprises data identifying a source of the predetermined signal. For example, the signal may include a MAC address of the source.

FIG. 9 illustrates an example of a methodology 900 employed by a wireless device for selecting a signaling technology based on a received message. Methodology 900 may be implemented by any one or more of control logic 406 (FIG. 4), control logic 506 (FIG. 5), and/or processor 704 (FIG. 7).

At 902, communications are performed via a first wireless transceiver employing a first network technology. In an example embodiment, a second wireless transceiver configured to communicate using a second network technology is put into a power save mode while communications are performed with the first wireless transceiver. In another example embodiment, the second wireless transceiver remains in an operational state while communications are performed via the first wireless transceiver.

At 904, a message is received instructing the wireless device to communicate using the second wireless technology, or that communications are available using the second wireless technology. In an example embodiment, the message is formatted in accordance with a predetermined format. In particular embodiments, the message is a SMS message.

In response to the signal received at 904 indicating that service is available for the second technology, at 906 communications are established using the second wireless network technology. In an example embodiment, the first wireless transceiver is switched to a power save state while communicating using the second wireless transceiver.

In an example embodiment, communications using the second technology are initiated automatically responsive to receiving the message indicating that service for the second wireless technology is available. In another example embodiment, a message is output to a user (e.g. audio, visual and/or audiovisual) indicating that service from the second wireless technology is available and waits for an input confirming the switch to use the second wireless technology before switching to the second wireless technology.

In an example embodiment, the wireless signal indicating that the second technology is available comprises data identifying a source of the predetermined signal. For example, the signal may include a MAC address of the source.

FIG. 10 illustrates an example of a methodology 1000 employed by an infrastructure node for instructing a wireless device to switch to a second signaling technology. Methodology 1000 may be implemented by control logic 606 (FIG. 6).

At 1002, the infrastructure node communicates with a mobile wireless device employing a first wireless technology. The first wireless technology may be any suitable protocol such as satellite, cellular, WiFi, etc.

At 1004, the infrastructure node determines whether the device is within proximity of an area where the wireless device can communicate using a second wireless network technology. There are an infinite number of ways the infrastructure node can make this determination. For example, an RFID tag sensor may be installed at an access point (AP), and if the AP detects an RFID tag from the wireless device then it can determine that the wireless device is within proximity of the AP. As another example, a remote sensor may be placed at a 'choke point' for example at the entrance to a building. A signal may be broadcast, which may be for the second technology or any other suitable technology. If the remote sensor detects a reflected signal from the mobile wireless device, a determination can be made that the mobile wireless device is within proximity of an area that supports the second technology. In other embodiments, the location of the wireless device may be determined using RSSI and/or AOA of signals received from the mobile wireless device. In still yet other example embodiments, GPS coordinates may be received from the mobile wireless device which enables the infrastructure node to determine where the mobile wireless device is and whether it can communicate using the second wireless technology. In particular embodiments, data identifying the mobile wireless device may also be acquired. For example, data representative of a telephone number or MAC address of the wireless mobile device may be acquired.

If, at 1004, a determination is made that the mobile wireless device is not in proximity of an area where the second wireless technology is available (NO), communications continue using the first technology at 1002. If, however, at 1004, a determination is made that the mobile wireless device is in proximity of an area where the second wireless technology is available (YES), at 1006 a message is sent to the mobile wireless device informing the wireless mobile device that the second wireless technology is available. The message may be sent in accordance with a predetermined format. For example, a SMS message may be sent.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:
1. An apparatus, comprising:
   a first wireless transceiver employing a first communication technology;
   a second wireless transceiver employing a second communication technology;
   control logic coupled with the first transceiver and second transceiver, the control logic is operable to determine whether the first wireless transceiver operates in an operating state or in a power save state;

wherein while the first transceiver is in the operating state, the control logic is responsive to a predetermined signal received via the first transceiver to establish communication with a wireless network employing the second communication technology via the second wireless transceiver;

wherein while the first transceiver is in the operating state, the control logic is operative to determine data representative of a position of the apparatus relative to the wireless network employing the second communication technology, and to transmit the data via the first wireless transceiver; and wherein the control logic is further operable to switch the first wireless transceiver into the power save state while the second wireless transceiver is communicating with the wireless network.

2. The apparatus of claim 1, further comprising a passive wireless signal reflecting circuit.

3. The apparatus of claim 1, further comprising a radio frequency identification tag.

4. The apparatus of claim 1, wherein the control logic is further operable to switch the second transceiver to the power save state while the second wireless transceiver is not communicating with the wireless network.

5. The apparatus of claim 1, wherein the control logic automatically switches the second wireless transceiver to the operating state responsive to receiving the predetermined signal.

6. The apparatus of claim 1, wherein the control logic is operable to output a message on a user interface indicating that communications employing the second communication technology are available; and wherein the control logic is operable to switch on the second wireless transceiver responsive to receiving an input via the user interface to establish communications employing the second communication technology.

7. The apparatus of claim 1, wherein power consumption of the first wireless transceiver while the first wireless transceiver is in the operating state is greater than power consumption of the second wireless transceiver.

8. The apparatus of claim 1, wherein the predetermined signal is a short message system (SMS) compatible message.

9. The apparatus of claim 1, further comprising a wireless signal reflecting circuit operable for generating a reflected circuit upon detecting a predetermined signal, wherein the reflected signal comprises data representative of an identifier.

10. The apparatus of claim 9, wherein the data representative of an identifier is a telephone number.

11. The apparatus of claim 1, wherein the control logic is responsive to a second predetermined signal received via one of a group consisting of the first wireless transceiver, second wireless transceiver, and the first wireless transceiver and second wireless transceiver to switch the second wireless transceiver from the operating state to a power save state.

12. An apparatus, comprising:
a first wireless transceiver employing a first communication technology;
a second wireless transceiver employing a second communication technology;
a wireless signal detector circuit operable to receive a wireless signal indicating that communications employing the second communication technology are available;
control logic coupled with the first transceiver, second transceiver, and wireless signal detector, the control logic is operable to determine whether the first wireless transceiver operates in an operating state or in a power save state;
wherein the control logic is responsive to the wireless signal detector receiving a predetermined signal indicating that communications employing the communication technology is available to establish communications with an associated wireless network via the second wireless transceiver and to discontinue communications using the first wireless transceiver; and,
wherein the control logic is operative to determine data representative of a position of the apparatus relative to the associated wireless network and to transmit the data via the first wireless transceiver.

13. The apparatus set forth in claim 12, wherein the sensor is a passive sensor.

14. The apparatus set forth in claim 12, wherein the sensor is a radio frequency identification tag sensor.

15. The apparatus set forth in claim 12, wherein the predetermined signal comprises data identifying a source of the predetermined signal.

16. The apparatus set forth in claim 15, wherein the data identifying a source of the predetermined signal is a Media Access Control address of the source.

17. The apparatus set forth in claim 12, wherein the first wireless transceiver is transitioned to a power save state while the second wireless transceiver is communicating using the second communication technology.

* * * * *